United States Patent
Brouwer et al.

(10) Patent No.: US 10,232,778 B2
(45) Date of Patent: Mar. 19, 2019

(54) ADJUSTING INSTRUMENT, EXTERIOR MIRROR UNIT, MOTOR VEHICLE

(71) Applicant: MCi (Mirror Controls International) Netherlands B.V., Woerden (NL)

(72) Inventors: Stefan Frits Brouwer, Woerden (NL); Rudolf Pieter Hoogenboom, Woerden (NL); Peter Alexander Hamming, Woerden (NL)

(73) Assignee: MCi (Mirror Controls International) Netherlands B.V., Woerden (NL)

( * ) Notice: Subject to any disclaimer, the term of this patent is extended or adjusted under 35 U.S.C. 154(b) by 0 days.

(21) Appl. No.: 15/509,031

(22) PCT Filed: Sep. 21, 2015

(86) PCT No.: PCT/NL2015/050653
§ 371 (c)(1),
(2) Date: Mar. 6, 2017

(87) PCT Pub. No.: WO2016/048141
PCT Pub. Date: Mar. 31, 2016

(65) Prior Publication Data
US 2017/0240115 A1 Aug. 24, 2017

(30) Foreign Application Priority Data

Sep. 22, 2014 (NL) ..................................... 2013508

(51) Int. Cl.
*B60R 1/074* (2006.01)
*B60R 16/02* (2006.01)
*B60R 1/06* (2006.01)

(52) U.S. Cl.
CPC ............ *B60R 1/074* (2013.01); *B60R 1/0602* (2013.01); *B60R 16/0215* (2013.01)

(58) Field of Classification Search
CPC ..... B60R 16/0215; B60R 1/06; B60R 1/0612; G02B 7/182; G02B 7/198
(Continued)

(56) References Cited

U.S. PATENT DOCUMENTS 3,936,158 A * 2/1976 Cianciolo ............. B60R 1/0612
359/873
4,957,265 A * 9/1990 Seitz ....................... B60R 1/076
248/479

(Continued)

FOREIGN PATENT DOCUMENTS

GB 2168658 A 6/1986
WO 2003040797 A1 5/2003

*Primary Examiner* — Frank G Font
(74) *Attorney, Agent, or Firm* — Volpe and Koenig, P.C.

(57) ABSTRACT

Adjusting instrument for an exterior mirror of a motor vehicle, comprising a foot for attachment to a fixed element of the motor vehicle, and a housing adjustably connected with the foot, the housing being adjustable around a rotation axis extending through the adjusting instrument, while around the rotation axis a passage opening is provided for passing through a cable tree, the housing being provided with a slot along a height thereof which provides lateral access to the passage opening and the foot being provided with a slot along a height thereof which provides lateral access to the passage opening, the housing being furthermore adjustable relative to the foot into an assembly position in which the slot of the foot aligns with the slot of the housing to provide lateral access to the passage opening for laterally introducing a cable tree into the passage opening.

20 Claims, 7 Drawing Sheets

(58) Field of Classification Search
USPC .............. 359/841, 871, 872, 881; 296/1.11
See application file for complete search history.

(56) References Cited

U.S. PATENT DOCUMENTS

| | | | | |
|---|---|---|---|---|
| 5,719,713 | A * | 2/1998 | Brown | B60R 1/025 |
| | | | | 359/843 |
| 6,315,421 | B1 | 11/2001 | Apfelbeck et al. | |
| 6,329,925 | B1 * | 12/2001 | Skiver | B60R 1/12 |
| | | | | 340/425.5 |
| 6,467,919 | B1 * | 10/2002 | Rumsey | B60R 1/04 |
| | | | | 359/871 |
| 6,672,730 | B1 * | 1/2004 | Hanft | B60R 1/0612 |
| | | | | 359/871 |
| 6,705,738 | B2 * | 3/2004 | Nickel | B60R 1/06 |
| | | | | 359/871 |
| 8,931,583 | B2 * | 1/2015 | Tuckowski | A61G 5/043 |
| | | | | 180/65.1 |
| 2005/0092511 | A1 | 5/2005 | Sekino et al. | |
| 2012/0162796 | A1 | 6/2012 | Van Zuijlen et al. | |

\* cited by examiner

ADJUSTING INSTRUMENT, EXTERIOR MIRROR UNIT, MOTOR VEHICLE

CROSS REFERENCE TO RELATED APPLICATION

This application is a 35 USC § 371 National Stage application of International Patent Application No. PCT/NL2015/050653, which was filed Sep. 21, 2015, entitled "Adjusting Instrument, Exterior Mirror Unit, Motor Vehicle" and Netherlands Patent Application No. 2013508, which was filed Sep. 22, 2014, and are incorporated herein by reference as if fully set forth.

FIELD OF INVENTION

The invention relates to an adjusting instrument for an exterior mirror of a motor vehicle. The adjusting instrument usually comprises a foot for attachment to a fixed element of the motor vehicle, possibly being a mirror shoe of the exterior mirror or the motor vehicle itself. The adjusting instrument furthermore may comprise a housing adjustably connected with the foot.

BACKGROUND

Such adjusting instruments are generally known and are frequently used in exterior mirrors of motor vehicles. The exterior mirror usually comprises a mirror cap, provided with a mirror glass, and a mirror shoe, the mirror shoe being attachable to the motor vehicle for example. The adjusting instrument is usually situated in the mirror cap. By adjustment of the adjusting instrument, the mirror cap is adjustable between a folded-in position in which the mirror cap extends substantially along the motor vehicle and a folded-out position in which the mirror cap extends substantially transversely to the motor vehicle. By adjustment of the mirror cap, damage to the exterior mirror can be reduced whenever the exterior mirror were to come into contact with an object such as a lamppost or another vehicle.

The folded-in position or parking position of the exterior mirror is typically used after the motor vehicle has been parked. For instance, the width of the motor vehicle can then be reduced, whereby the chances of unforeseen contact of the exterior mirror with an object can be reduced, so that the chances of damage can be reduced. In the folded-out position or driving position of the exterior mirror, the vehicle can be driven.

Adjusting the exterior mirror can be done manually and/or can be done in a driven manner, for instance through drive by an actuator included in the adjusting instrument.

The exterior mirror may further be provided with a plurality of electric components, such as an actuator for adjusting the mirror glass, a heating element for heating the mirror glass, a dimmer for dimming the mirror glass, a blinker, a sensor for measuring the outside temperature, etc. These electric components are typically provided with electric energy and/or data via current conducting cables. Such current conducting cables are normally bundled in a so-called 'cable tree' leading from the motor vehicle to the electric components.

The cable tree is usually guided through a central shaft bush of the adjusting instrument, so that the position of the cable tree approximately coincides with the rotation axis of the adjusting instrument to counteract damage of the cable tree and/or of the current conducting cables.

The current conducting cables of the cable tree are usually provided with a plurality of different connecting elements for connection with the different electric components in the mirror cap. To guide the cable tree including the elements attached thereto through the shaft bush, the inner diameter of the shaft bush is usually sufficiently large to enable even the largest connector to be passed through it. The diameter of the shaft bush is then determinative of the dimensions of the adjusting instrument, in consequence of which the adjusting instrument needs to be made of relatively large design. The dimensions of the adjusting instrument can also have an influence on the dimensions and/or design of the exterior mirror and/or on the possibility of additionally including various electric components in the exterior mirror. It is experienced as a drawback that the relatively large dimensions of the adjusting instrument may limit the designer in designing a compact and/or elegant exterior mirror. It is also experienced as a drawback that the relatively large dimensions of the adjusting instrument can limit the designer in the application of electric functions in the exterior mirror.

Alternatively, the inner diameter of the shaft bush could be made sufficiently small to pass through just the cable tree, after which the connecting elements, such as plugs, connectors, etc., can be attached to the current conducting cables afterwards. This, however, is usually incompatible with the assembly methodology of a vehicle manufacturer.

Alternatively, use can be made of a BUS structure, whereby the cable tree can be limited to, for example, two current carrying conducting cables and one data cable. A computing unit within the mirror housing can then control the different electric components. This solution, however, is relatively costly and is not used much.

Accordingly, there is a need for an adjusting instrument of relatively compact dimensions.

SUMMARY

An object of the invention is to provide an adjusting instrument having relatively compact dimensions, in particular, to provide an adjusting instrument having relatively compact dimensions allowing the cable tree to be passed through relatively simply.

To this end, the invention provides an adjusting instrument according to claim 1.

By providing an adjusting instrument whose foot and housing are provided with a slot which in an assembly position provides a lateral access to the passage opening, the cable tree can be arranged in the adjusting instrument in a relatively simple manner. Thus, the cable tree can already be provided beforehand with the connecting elements in question, such as connectors, plugs, etc., and can thereupon, via the slot of the adjusting instrument, be laterally brought into the passage opening. The connecting elements thus do not need to be passed through the passage opening anymore, so that the diameter of the passage opening can be smaller. Due to a smaller diameter of the passage opening being possible, the external dimensions of the adjusting instrument can likewise be smaller. As a consequence, the designer has more freedom of design again to design an elegant mirror cap and/or to arrange various electric components in the mirror cap.

The slot in the foot and in the housing may be implemented in the axial direction of the adjusting instrument, i.e., parallel to the rotation axis, but may also be of oblique design or be designed as a part of a spiral about the rotation axis. Many variants are possible.

After assembly of the cable tree into the adjusting instrument, the adjusting instrument with cable tree can be offered to, for example, an exterior mirror manufacturer who can build the adjusting instrument with cable tree into a mirror cap.

Possibly, the adjusting instrument may be provided with a closing element for locking the cable tree in the passage opening. With this feature, a sideways movement of the cable tree during use, for instance during adjustment, can be counteracted, so that damage and/or squeezing of the cable tree can be counteracted. For instance, the closing element may be designed as a filler piece which at least partly fills up the slot after assembly of the cable tree. Or the closing element may be implemented as a ring or a hook which confines the cable tree in the passage opening after assembly. Many variants are possible.

In an embodiment, there may furthermore be provided a passage tube which is receivable in the passage opening, and in which the cable tree is introduced. The passage tube is provided with a slot, for instance, the passage tube may be U-shaped, so that the cable tree can be laterally inserted into the passage tube. The passage tube can thereupon function as shaft bush around which the housing is adjustable relative to the foot. By, after assembly of the cable tree, adjusting the passage tube further so that the slot of the passage tube does not align with the slot of the adjusting instrument anymore, the passage tube functions as closing element and the cable tree can be locked up in the passage tube.

In an embodiment, the foot of the adjusting instrument is configured to be connected with the fixed element of the motor vehicle, for instance with a shoe of the mirror cap, or with an arm extending from the motor vehicle. The connecting device of the foot can comprise, for example, a screwed connection. According to an aspect of the invention, the connecting device comprises cooperating elements on the foot and on the fixed element. The cooperating elements are translatable relative to each other in one direction and block translation in the opposite direction. The foot is provided with first cooperating elements and the fixed element is provided with second cooperating elements.

This linear connecting device can be regarded as an invention in itself.

An aspect concerns an adjusting instrument for an exterior mirror of a motor vehicle, comprising a foot for attachment to the fixed element, being the motor vehicle, and a housing adjustably connected with the foot, the housing being adjustable about a rotation axis which extends through the adjusting instrument, while the foot is provided with first cooperating elements which are translatable relative to second cooperating elements of the fixed element in one direction and which block translation in an opposite direction for connection of the foot with the fixed element.

Another aspect is that the adjusting instrument is provided with a passage tube around the rotation axis through which a cable tree can be passed and/or where the passage tube functions as bearing.

Another aspect is that the adjusting instrument comprises a passage tube which is provided with an upper flange which extends in a direction transverse to the rotation axis. Possibly, the passage tube is further provided with a lower flange which extends in a direction transverse to the rotation axis. According to another aspect, the adjusting instrument is lockable between the upper flange and the lower flange of the passage tube.

In another aspect, the lower flange is translatably connectable with the fixed element of the motor vehicle. The lower flange may be provided with the first cooperating elements which can cooperate with the second cooperating elements on the fixed element.

For instance, the first cooperating elements can be a rib which is slidable into a groove of the fixed element. The fixed element can then comprise resilient fingers to lock the rib, and thus block translation in opposite direction. The second cooperating elements on the fixed element in this exemplary embodiment comprise the groove and the resilient fingers. Other variants are also possible. For instance, the first and the second cooperating elements may be implemented as cam-shaped elements having a first surface with a relatively gentle inclination so that translation is possible in a direction of the rising inclination, and having a second surface with a relatively steep inclination, so that translation can be blocked in the direction of the rising inclination, which is opposite to the first inclination. Between the cams of the second cooperating elements there is space into which the cams of the first cooperating elements can fit.

Further advantageous embodiments are represented in the subclaims.

The invention furthermore relates to a method for assembly of a cable tree into an adjusting instrument.

The invention also relates to an exterior mirror provided with such an adjusting instrument and to a motor vehicle provided with such an adjusting instrument.

BRIEF DESCRIPTION OF THE DRAWINGS

The invention will be elucidated in more detail on the basis of non-limiting exemplary embodiments which are represented in a drawing. In the drawing.

It is noted that the drawing figures are merely schematic representations of preferred embodiments of the invention. In the drawing figures, like or corresponding parts are denoted with the same or corresponding reference numerals.

DETAILED DESCRIPTION OF THE PREFERRED EMBODIMENTS

As regards the purport of this disclosure, it is pointed out that all the technical features and elements specifically described and/or shown here are also understood to have been described and/or shown separately and can each also be applied individually and/or can be applied in combination with one or more other features and/or elements and are understood to have been described herein as such. The skilled person reading the description will appreciate that such technical features and/or elements can be seen apart from the context of the exemplary embodiment given, and furthermore can be seen apart from the technical features with which they cooperate in the context of the example. In order to keep the description concise, however, these features, elements and combinations are not all literally described and/or shown as a separate feature, element, combination or embodiment.

Figure 1:
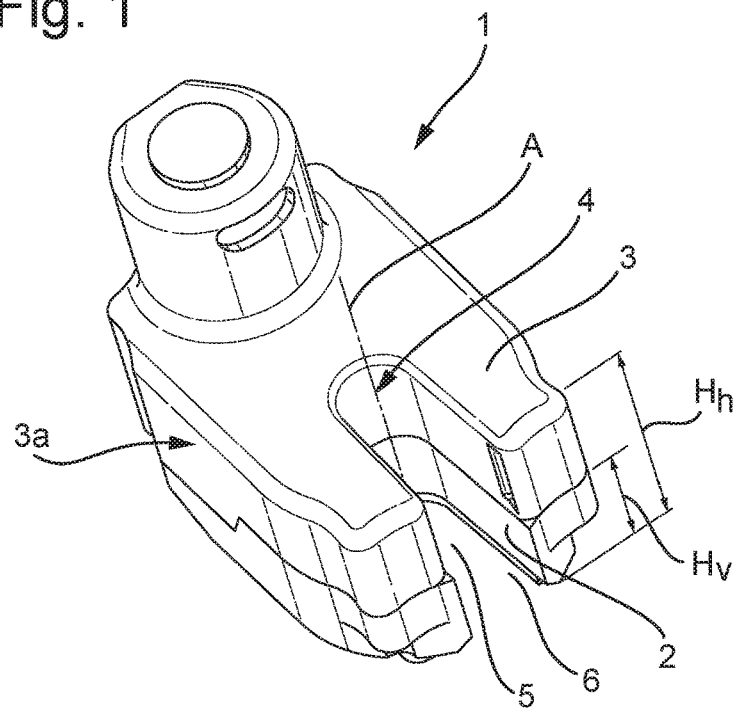
FIG. 1 shows a schematic perspective view of a first embodiment of an adjusting instrument according to the invention.

FIG. 1 shows a schematic perspective view of an adjusting instrument 1 according to the invention. The adjusting instrument 1 comprises a foot 2 for attachment to the fixed element of the motor vehicle. The attachment to the fixed element can be carried out, for instance, by fastening the foot 2 to a mirror shoe of an exterior mirror of the motor vehicle. The mirror shoe can thereupon be fixedly connected with, for instance, a door of the motor vehicle.

The foot 2 can be connected with the mirror shoe in various manners, for instance with the aid of screws or with the aid of a linear connecting device such as shown, for instance, in FIGS. 9-15.

The adjusting instrument 1 furthermore comprises a housing 3 which is adjustably connected with the foot 2. A mirror cap of the exterior mirror can be connected, for instance, with the housing 3. Then, upon adjustment of the housing 3 relative to the foot 2, the mirror cap can be adjusted relative to the motor vehicle. For instance, the mirror cap may be adjustable between a folded-in position or parking position in which the mirror cap extends substantially along the motor vehicle, and a folded-out position or driving position, in which the mirror cap extends substantially transversely to the motor vehicle.

The housing 3 of the adjusting instrument 1 is adjustable relative to the foot 2 around a rotation axis A. The rotation axis A extends through the adjusting instrument 1, both through the foot 2 and through the housing 3. The rotation axis A can extend in a direction practically parallel to a height direction of the adjusting instrument 1, but can also run obliquely through the adjusting instrument 1. Many positions of the rotation axis A are possible.

Around the rotation axis A, usually, a passage opening 4 is provided. The passage opening 4 can extend as a tubular opening around the rotation axis A and is usually used to pass a cable tree through it. Advantageously, the cable tree is then on or near the rotation axis A of the adjusting instrument 1, so that damage or fatigue of the cable tree resulting, for instance, from movement and/or squeezing during adjustment can be counteracted.

As the cable tree is usually already provided with fastening elements, such as plugs or connectors, for attachment to an electric component in the mirror cap, these fastening elements are likewise, along with the cable tree, passed through the passage opening. As a consequence, the inner diameter of the passage opening becomes relatively large, usually larger than the outer diameter of the largest connecting element, as a result of which, after passing through the cable tree, relatively much space in the passage opening remains unused. The dimensions of the adjusting instrument are thereby adversely affected in that the adjusting instrument is likewise made of relatively large design.

According to the invention, the housing 3 is provided with a first slot 5 along a height Hh of the housing 3. The first slot 5 provides lateral access to the passage opening 4. Furthermore, the foot 2 is provided with a second slot 6 along a height Hv of the foot 2. The second slot 6 provides lateral access to the passage opening 4. To bring a cable tree via the slots 5 and 6 into the passage opening 4, the slots 5 and 6 need to align, as shown in FIG. 1. To this end, the housing 3 and the foot 2 are adjustable relative to each other into an assembly position. When the housing 3 and the foot 2 are in the assembly position, the slot 5 of the housing 3 and the slot 6 of the foot link up with each other, and the cable tree can be laterally brought into the passage opening 4. Due to a lateral assembly of the cable tree in the adjusting instrument 1, the fastening elements of the cable tree do not need to be passed through the passage opening 4 anymore, so that the passage opening 4 can be made of smaller design.

Given smaller dimensions, for instance a smaller diameter, of the passage opening 4, the general dimensions, in particular the outer dimensions of the adjusting instrument 1, can also be smaller. As a result, the design freedom can increase, both as regards possible mirror cap shapes and possible electric components in the mirror cap.

The first slot 5 of the housing 3, and/or the second slot 6 of the foot 2, may be implemented as a straight slot 5, 6, as shown, for instance, in the exemplary embodiment of FIG. 1, but may also be implemented as an oblique slot, or as a part of a spiral around the rotation axis. Many variants are possible, as long as the cable tree can be brought from a side into the passage opening 4.

Optionally, after assembly of the cable tree into the passage opening 4, the cable tree may be locked in the first and/or second slot 5, 6, for instance by providing a closing element. The closing element can be, for instance, a—U-shaped—ring which can be slid over the cable tree, or can be a clamp with which the cable tree can be locked up in the passage opening. Also, the closing element can be a foam-shaped or rubbery filler piece, which, after assembly of the cable tree, can be introduced into the slots. Many variants are possible. Advantageously, the cable tree then remains approximately at the position of the rotation axis, which can reduce the chances of damage to the cable tree during adjustment.

In the exemplary embodiment shown, the housing 3 comprises an upper part 3a and a lower part 3b. The upper and the lower housing parts 3a, 3b are fixedly connected with each other, for instance by means of screws, or snap connection, etc. In the lower housing part 3b, the foot 2 is arranged which is rotatably situated in the housing part 3b.

In another embodiment, furthermore, a passage tube 7 may be provided which is receivable in the passage opening 4. The passage tube 7 is likewise configured to provide the cable tree access to the passage tube 7 via a side, for instance via a slot 8 in a length direction of the passage tube 7. The slot 8, however, may also be of oblique configuration relative to a length direction of the passage tube 7, or can be a part of a spiral. Advantageously, the slot 8 is so designed that in the assembly position, in which the first slot 5 of the housing 3 aligns with the second slot 6 of the foot 2, the slot 8 likewise aligns with the first and the second slot 5, 6, thereby providing for lateral access of the cable tree into the passage tube 7 which is in the receiving opening 4.

The passage tube 7 may be implemented as a separate part that can be introduced into the passage opening 4, for instance by likewise making use of the lateral access provided by the slots 5, 6 of the housing 3 and the foot 2.

Figure 2:
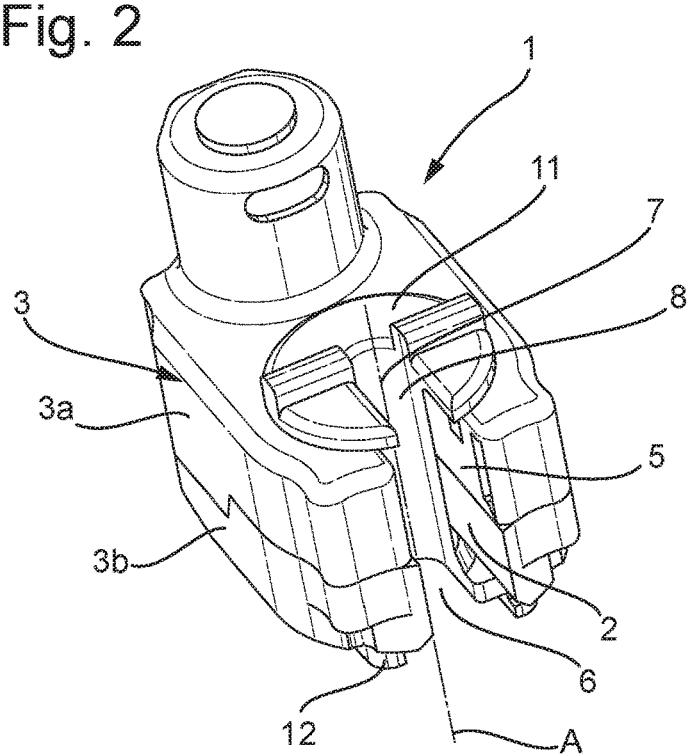
FIG. 2 shows a schematic perspective view of a second embodiment of an adjusting instrument according to the invention.
Figure 3:
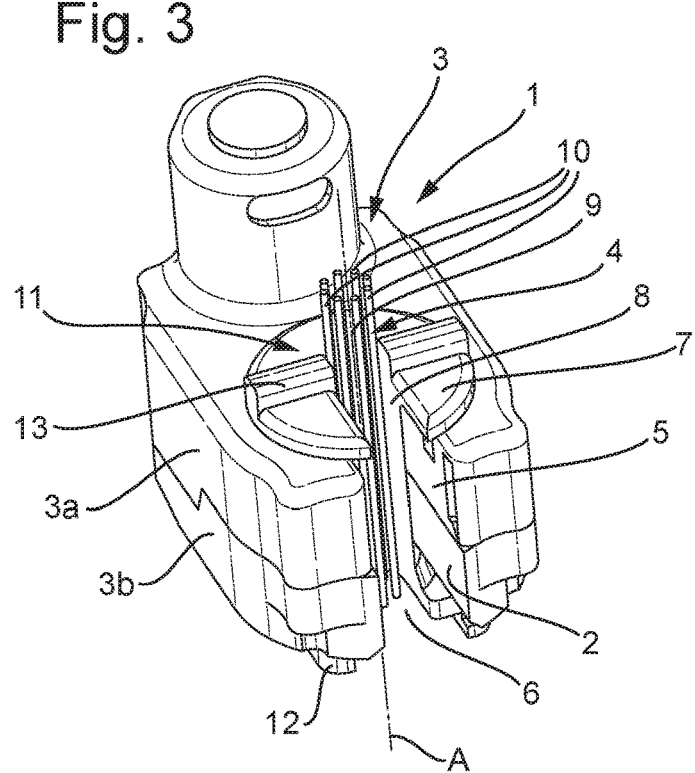
FIG. 3 shows a schematic perspective view of an adjusting instrument in the assembly position.
Figure 4:
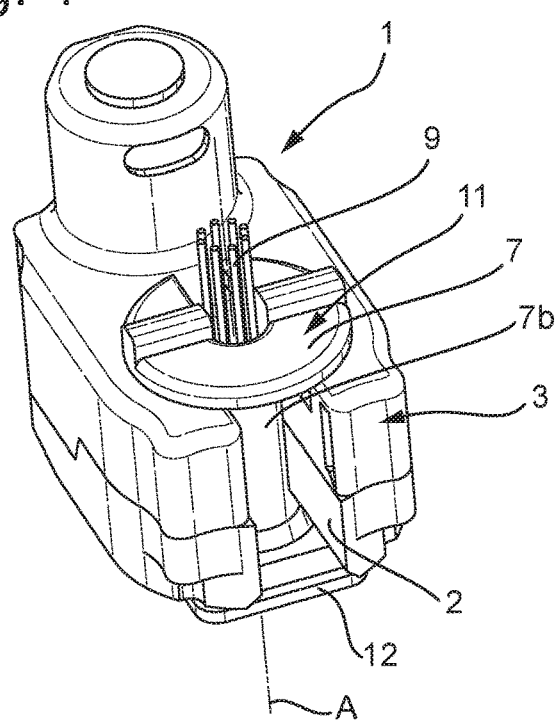
FIG. 4 shows a schematic perspective view of an adjusting instrument provided with a cable tree.

FIG. 2 shows the adjusting instrument 1 provided with the passage tube 7 in the assembly position. Presently, lateral access of the cable tree into the passage tube 7 is possible. FIG. 3 shows schematically a cable tree 9 which is in the passage tube 7. For simplification of the figure, the cable tree 9 is here represented as a plurality of current conducting wires 10, without fastening elements.

After assembly of the cable tree 9, the passage tube 7 can be pivoted to thereby lock the cable tree 9 in the passage tube 7 and close off the slots 5, 6. A sidewall 7b of the passage tube 7 then functions as closing element for locking the cable tree 9, so that sideways movement of the cable tree 9 away from the rotation axis can be counteracted.

The passage tube 7 is here provided with an upper flange 11 and a lower flange 12. The upper and the lower flange 11, 12 here extend in a direction transverse to the longitudinal direction of the passage tube 7. After assembly of the passage tube 7 in the passage opening 4, the upper and the lower flanges 11, 12 can respectively be above and under the adjusting instrument 1, thereby locking the adjusting instrument 1 in axial direction, i.e., in a direction parallel to the rotation axis. Thus, for instance, the various housing parts 3a, 3b can be locked.

The passage tube 7 can also function as a rotation bush around which the housing 3 of the adjusting instrument 1 is rotatably bearing-mounted. The passage tube 7 is preferably connected with the fixed element of the motor vehicle and/or with the foot 2. For instance, the passage tube 7 can be screwed to the foot 2 and thus be connected with the fixed element. Alternatively, the lower flange 12 can be connected with the fixed element, for instance with a screw or snap connection or with a linear connecting device such as shown, for instance, in FIGS. 9-15.

In the exemplary embodiment shown, the upper flange 11 is provided with a rib 13. The rib 13 here functions as a holding element for, after assembly of the passage tube 7 and the cable tree 9 in the adjusting instrument 1, grasping and rotating the passage tube 7, so that the passage opening 4 can be closed off. Instead of a rib 13, a slot may be provided, or a hook, or a snap connection or the holding element may optionally be left out.

Figure 5:
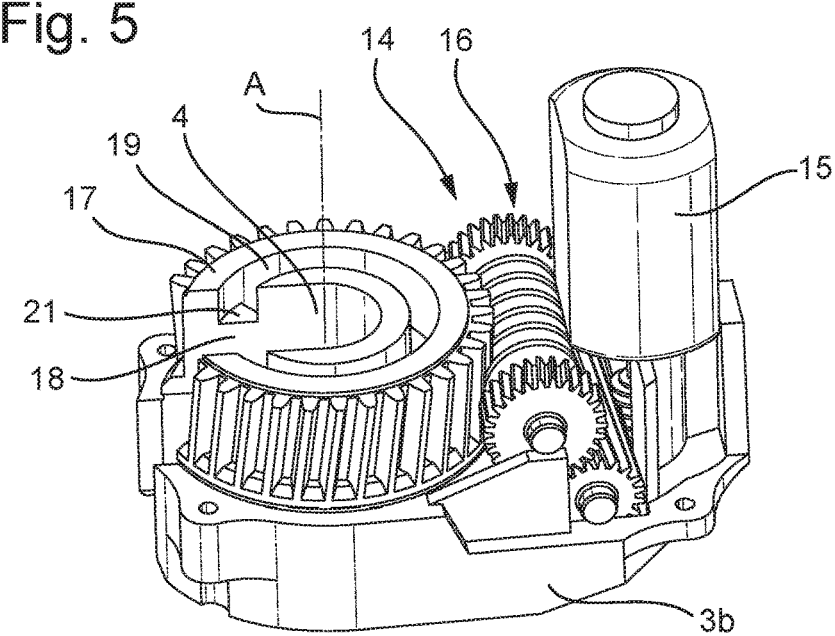
FIG. 5 shows a schematic perspective view of an embodiment of a drive unit of an adjusting instrument.

In an advantageous embodiment, the adjusting instrument 1 is provided with a drive unit 14 for adjusting the housing 3 relative to the foot 2. In the representation of FIG. 5, the lower housing part 3b is shown, the upper housing part 3a is left out, so that the drive unit 14 is visible. The drive unit 14 comprises a motor 15, for example an electric motor, which, via a drive train 16, drives a drive wheel 17. The drive wheel 17 is connected with the foot 2, and the drive train 16 is connected with the housing 3, so that by driving the drive wheel 17, adjustment of the housing 3 relative to the foot 2 is effected.

The drive train 16 is here implemented by one worm wheel and two gear wheels and should be regarded merely as an example, for the drive train can also be implemented in many other ways, for instance by two worm wheels and one gear wheel or, for instance, by a cycloid gear wheel.

The drive wheel 17 is preferably arranged concentrically around the rotation axis A. The drive wheel 17 is provided with a slot 18 which provides for lateral access to the passage opening 4 around the rotation axis A. Thus, in the assembly position, when the first slot 5 of the housing 3, the second slot 6 of the foot 2, and the slot 18 of the drive wheel 17 link up with each other and form a lateral access to the passage opening 4, a cable tree can be brought from a side of the adjusting instrument 1 into the passage opening 4.

Figure 6:
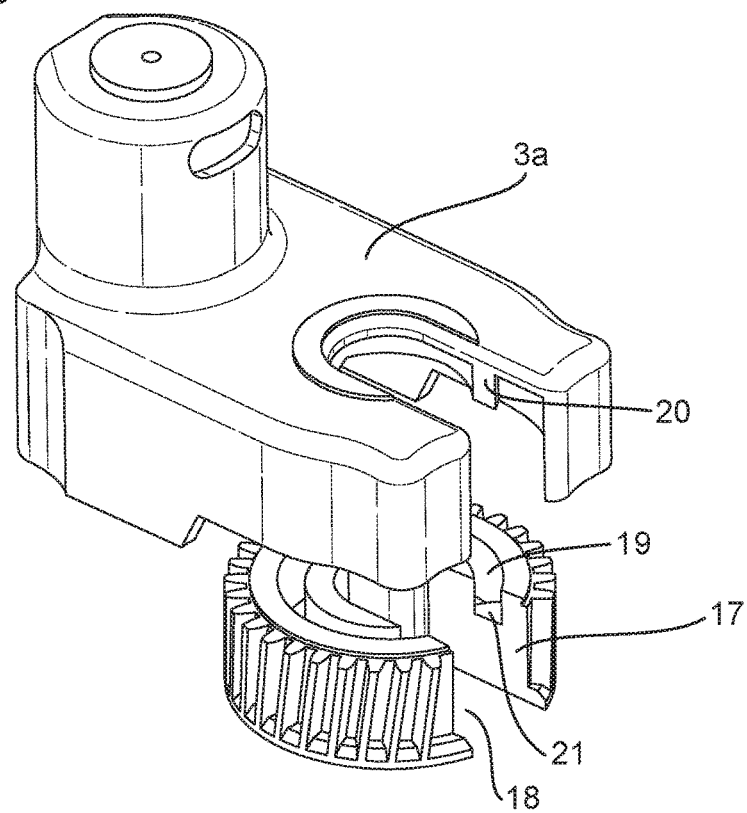
FIG. 6 shows a schematic perspective exploded view of a drive wheel of the drive unit and the housing of the adjusting instrument.

The housing 3 is adjustable relative to the drive wheel 17. To that end, the drive wheel 17 is provided with a guiding groove 19 in which a groove and/or rib and/or cam 20 of the housing 3 can move, shown in FIG. 6. Since the drive wheel 17, due to the presence of the slot 18, cannot move full circle through 360° anymore, there is provided in the groove 19 a stop 21 which can define the end of a stroke. Possibly, a plurality of stops 21 may be provided to define an angular displacement of an adjusting stroke.

Advantageously, the housing 3 is biased relative to the foot 2. To this end, the housing 3 is under spring action. Possibly, an elastic element, for instance a helical spring, may be provided, which is around the rotation axis. Preferably, the helical spring is substantially concentrically around the rotation axis, so that the line of action of the helical spring approximately coincides with the rotation axis. To provide lateral access to the passage opening, the helical spring preferably has one turn, or less than one turn. Alternatively, the bias can also be achieved by at least one elastic element placed at a distance from the rotation axis.

Figure 7:
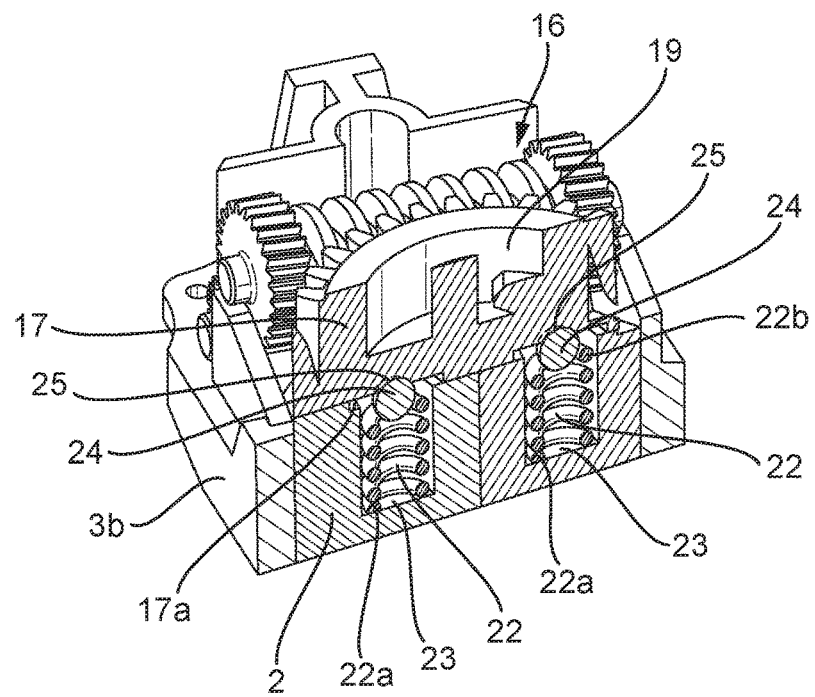
FIG. 7 shows a schematic cross section through the adjusting instrument.

In the exemplary embodiment shown in FIG. 7, two elastic elements 22 are provided which are at a distance from the rotation axis A, so that the line of action of the elastic element does not coincide with the rotation axis, but is substantially parallel thereto. The elastic elements 22 are here implemented as helical springs, but may also be implemented otherwise. The elastic elements 22 are in a recess 23 of the foot 2. The elastic elements 22 thus work on one side 22a on the foot 2, and on an opposite side 22b on an underside 17a of the drive wheel 17 and therefore on the housing 3. It is also conceivable that the one or more elastic elements are included in the drive wheel 17.

Possibly, a single elastic element 22 may be provided at a distance from the rotation axis A and/or the foot 2 may be wholly or partly of elastic design to thereby achieve the bias.

Advantageously, the drive wheel 17 is disengageably connected with the foot 2, and thus with the fixed element, as shown in the cross section of FIG. 7. Thus, the drive wheel 17 can be uncoupled from the fixed element, when the drive wheel 17 is not driven, for instance in the event of an unforeseen contact with an external object or, for instance, in the case of deliberate or inadvertent manual adjustment. To this end, between a side 22b of the elastic elements 22 and the underside 17a of the drive wheel 17, balls 24 are provided which are in a cavity 25 in the underside 17a of the drive wheel 17. The balls are thus under spring action, but as soon as an external force is greater than the spring force, the balls 24 can be forcibly dislodged from their cavity 25 and the drive wheel 17 can detach from the fixed element. The balls thus work as a clutch coupling. Other implementations of a clutch coupling, however, are also possible, for instance when foot and drive wheel are provided with a mating but disengageable cam pattern.

Figure 8:
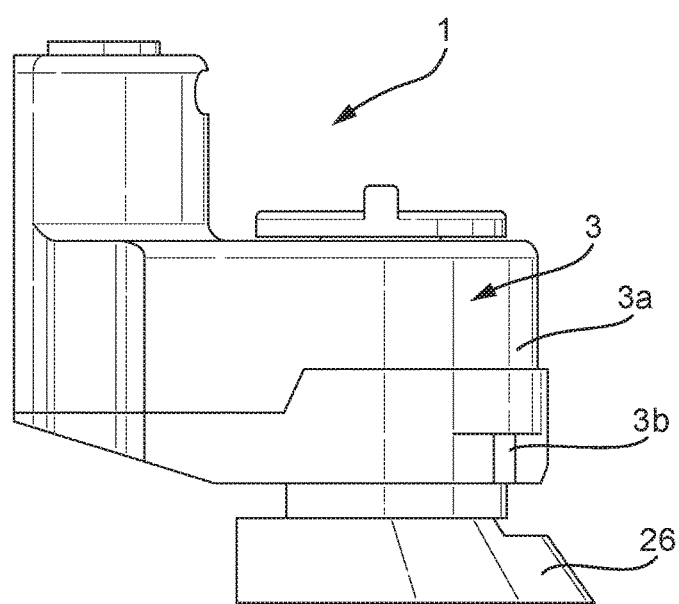
FIG. 8 shows a schematic side view of an adjusting instrument connected with the fixed element.
Figure 9:
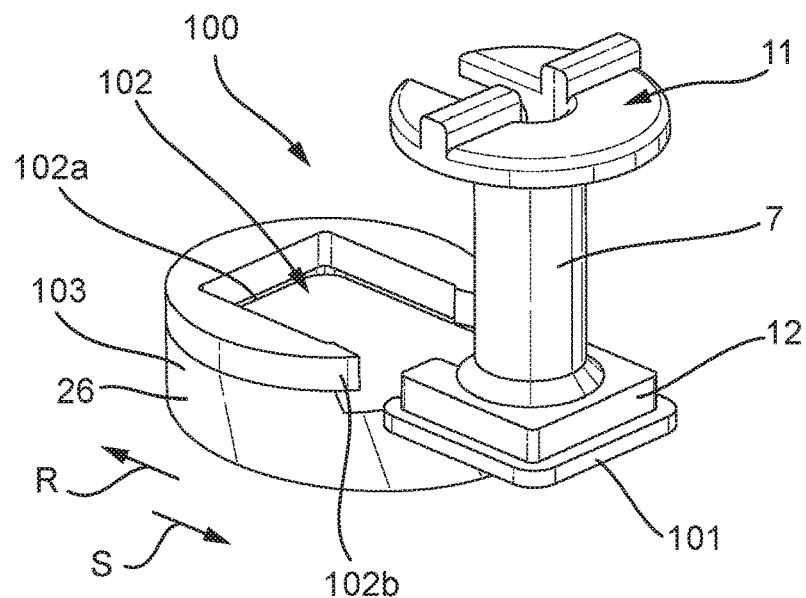
FIG. 9 shows a schematic exploded perspective view of a first embodiment of a linear connecting device.

FIG. 8 shows a side view of an adjusting instrument 1 which is connected with a mirror shoe 26 as the fixed element. The mirror shoe 26 in turn may itself be connectable with an arm extending from the motor vehicle. Many variants of connection with the motor vehicle are possible.

One possible connection between the adjusting instrument 1 and the fixed element is made, for instance, by utilizing a linear connecting device 100. The linear connecting device 100 comprises first cooperating elements 101 which are translatable relative to second cooperating elements 102 of the fixed element in one direction and which block translation in an opposite direction for connection of the foot with the fixed element. The fixed element is here represented by the mirror shoe 26.

Figure 10:
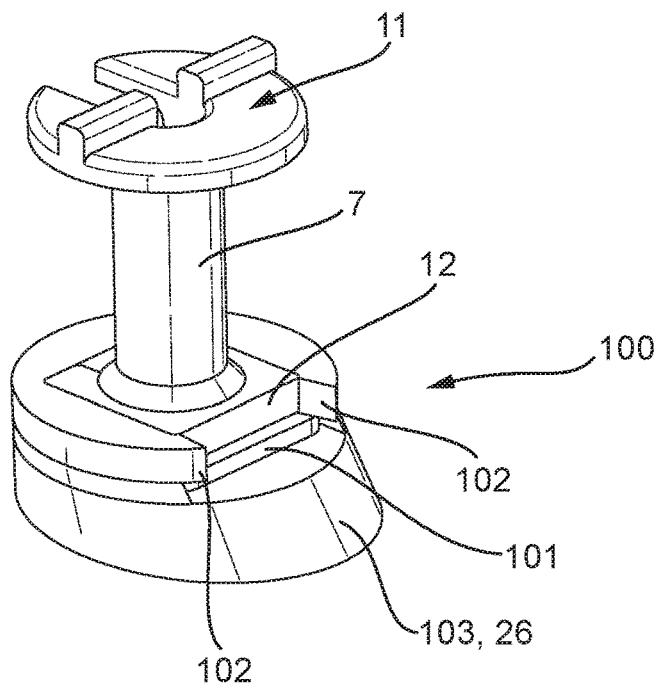
FIG. 10 shows a schematic perspective view of the linear connecting device of FIG. 9.
Figure 11:
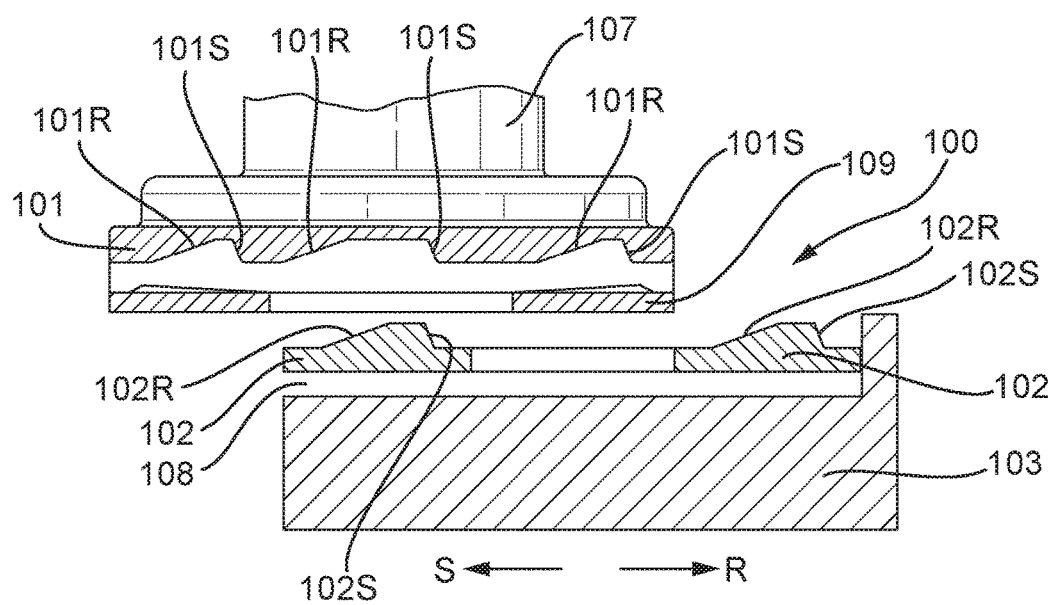
FIG. 11 shows a schematic exploded side view of a second embodiment of a linear connecting device.

The first cooperating elements 101 here comprise a rib 101 provided on the passage tube 7, which is translatable relative to the second cooperating elements 102, here implemented as a groove 102a of the mirror shoe 26. By introducing the rib 101 in the groove 102a, translation is possible. The second cooperating elements here furthermore comprise resilient fingers 102b. The resilient fingers 102b are on the mirror shoe 26 at a beginning of the groove 102a. The resilient fingers 102b thus permit translation in one direction R, that is, in a direction whereby the rib 101 is introduced into the groove 102a, in other words, in a direction past the fingers and away from the fingers. However, the resilient fingers 102b block translation of the rib 101 in groove 102a relative to the fingers 102b in the opposite direction S, that is, towards the fingers. Thus, a fixed connection of the passage tube 7, which can be a shaft bush 107 in other designs, with the fixed element 103 or mirror shoe 26 is obtained, as shown in FIG. 10.

In the adjusting instrument 1 as shown in FIGS. 1-8, there is further a foot 2 which is fixedly connectable to the fixed element. The foot 2 may be around the passage tube 7 and may be provided with recesses for screws. The screws may for instance be screwed into the foot 2 via an underside of the mirror shoe 26 through holes in the mirror shoe 26, thus allowing a fixed connection of the foot 2 to the fixed element to be effected. Alternatively, the passage tube 7 and the foot 2 can be fixedly connected with each other, while the passage tube 7 can optionally be connected with the mirror shoe 26 via the linear connecting device 100. The linear connecting device 100 is here implemented at an underside of the passage tube 7, in particular at the lower flange 12, but many variants are possible.

FIGS. 11-15 shows an alternative embodiment of the linear connecting device 100. The linear connecting device 100 comprises first cooperating elements 101, which are translatable relative to second cooperating elements 102. The first cooperating elements 101 are at an underside of a shaft bush 107, also called central shaft. The shaft bush 107 is usually biased under spring tension towards the fixed element 103. The second cooperating elements 102 are on a top of the fixed element 103, which may for instance be implemented as a mirror shoe.

The first and second cooperating elements 101, 102 are configured to allow translation in one direction R, and to block translation in the opposite direction S. To that end, the first and second cooperating elements 101, 102 are provided with a first inclined surface 101r, 102r having a relatively gentle inclination which makes translation in the direction R relatively easy. Furthermore, the first and second cooperating elements 101, 102 have a second inclined surface 101s, 102s having a relatively steep inclination, which makes translation in the opposite direction S rather difficult, so that translation can be blocked. Preferably, the first inclined surfaces 101r, 102r have a comparable or corresponding angle of inclination to facilitate translation.

The first and the second cooperating elements preferably have a shape that is corresponding. Advantageously, there are preferably at least as many first cooperating elements 101 as second cooperating elements 102, while at least an equal number of first cooperating elements 101 are shaped correspondingly to the second cooperating elements 102 cooperating therewith. Thus, a solid, fixed coupling can be effected.

Furthermore, the mirror shoe 103 is provided with a recess 108 in which a projection 109 of the shaft bush 107 is insertable. This recess 108 can function as guide, in some exemplary embodiments. Projection 109 may be configured to be movable under spring action relative to shaft bush 107, in an upward direction, perpendicular to a plane including directions S or R. For instance, under spring action the projection 109 may be depressible and/or translatable and/or pivotable. The spring action may be carried out, for instance, by a spring standing on a lower flange of the shaft bush 107, for example, a helical spring. Also, the spring action may be provided by at least one elastic element that is at a distance from the rotation axis of the shaft bush 107, and which may possibly be included in the fixed element 103. Many variants are possible.

Figure 12:
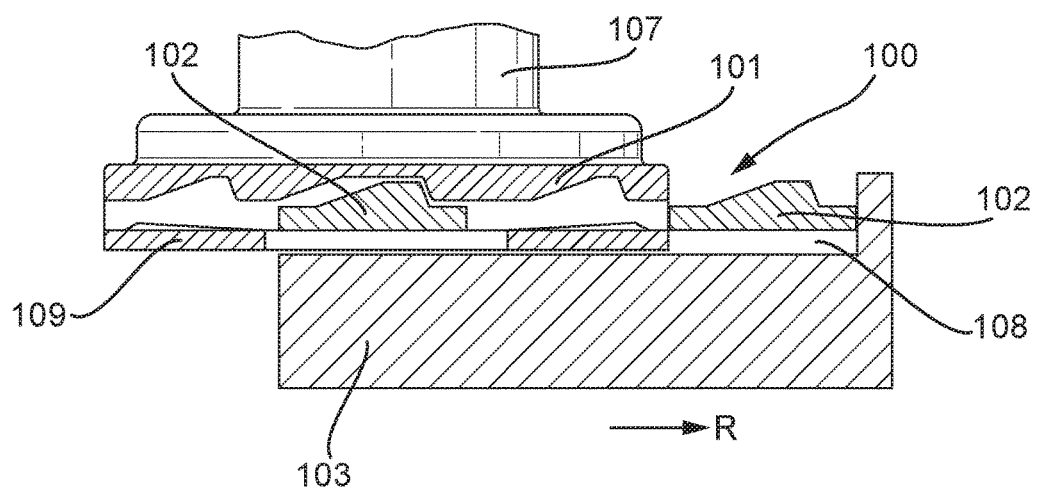
FIG. 12 shows a schematic side view of the linear connecting device of FIG. 11, with the foot translating relative to the fixed element.
Figure 13:
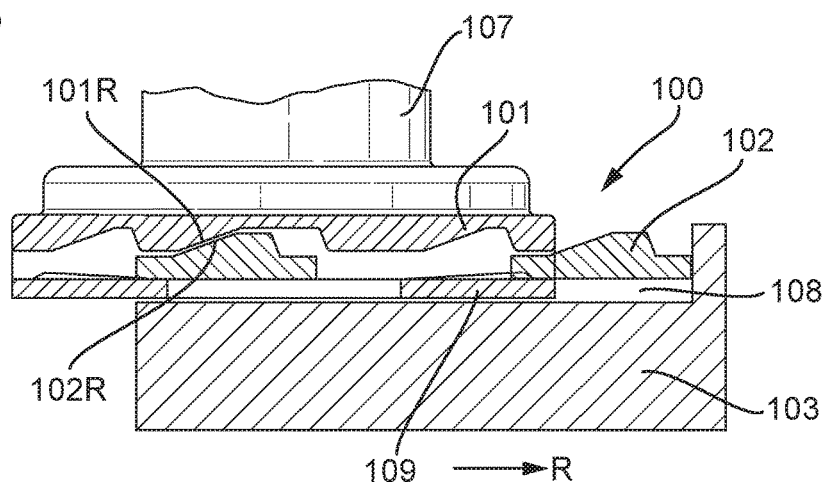
FIG. 13 shows a schematic side view of the linear connecting device of FIG. 11, with the foot in a further translation than in FIG. 12.
Figure 14:
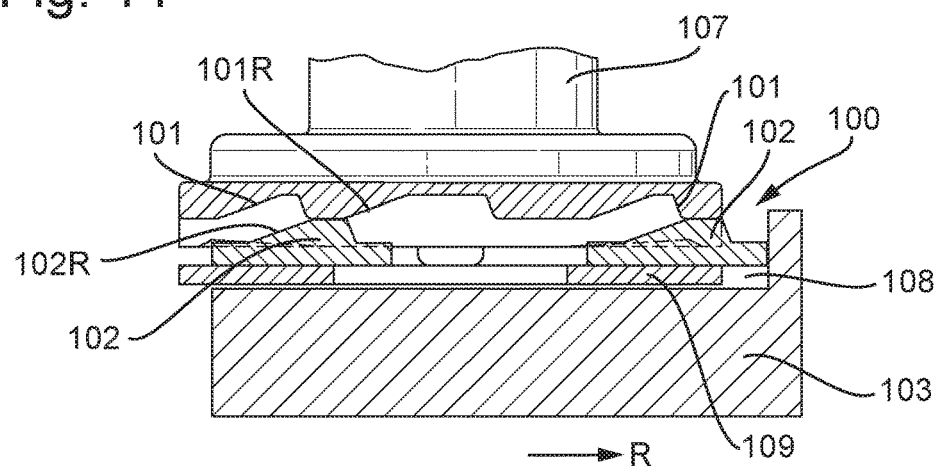
FIG. 14 shows a schematic side view of the linear connecting device of FIG. 11, with the foot in a further translation than in FIG. 13.
Figure 15:
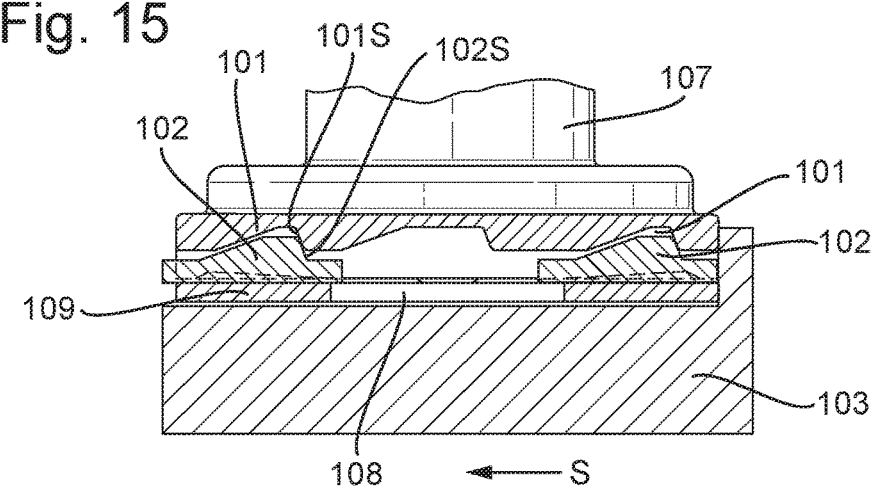
FIG. 15 shows a schematic side view of the linear connecting device of FIG. 11, with the foot in a further translation than in FIG. 14 and the foot connected with the fixed element.

When connecting the shaft bush 107 with the fixed element 103, the projection 109 is introduced into the recess 108, as shown in FIG. 12. The shaft bush 107 is thereupon translated in the direction R relative to the fixed element 103, whereby the first cooperating elements 101 move over the second cooperating elements 102. In FIG. 12 a position is shown in which one of the second cooperating elements 102 has already been passed by a first cooperating element 101 and now lies opposite a next first cooperating element 101. Upon further translation in the direction R, as shown in FIG. 13, an inclined surface 101r abuts against the inclined surface 102r of the second cooperating element 102. Upon yet further translation in the direction R, due to the inclined surfaces 101r, 102r, the first cooperating elements 101 can be moved upwards, usually against the force of a spring which is around the shaft bush 107, as shown in FIG. 14. Thereupon, a next first cooperating element 101 can fall over the second cooperating element 102. Upon further translation in the direction R, the first cooperating elements 101 can thus be further displaced relative to the second cooperating elements 102 until the end of the guide 109 has been arrived at, as shown in FIG. 15.

Translation in the opposite direction S can be blocked in that the angle of inclination of the inclined surfaces 101s, 102s is relatively large, the inclined surfaces 101s, 102s are fairly steep. This makes it very difficult for the cooperating elements 101, 102 to be uncoupled in the direction S against the force of the spring action.

The above-described linear connecting device 100 can be implemented in many ways, and can also be provided on various components of the adjusting instrument 1. For instance, the foot 2 may be provided with it, or the passage tube 7 may be provided with it. Many variants are possible. Also, the linear connecting device 100 can be regarded as an invention per se, independent of an adjusting instrument.

The invention is not limited to the exemplary embodiments given here. Many implementation variants are possible.

Such variants will be clear to those skilled in the art and are understood to be within the scope of the invention as set forth in the following claims.

The invention claimed is:
1. An adjusting instrument for an exterior mirror of a motor vehicle, comprising:

a foot configured for attachment to a fixed element of the motor vehicle;

a housing adjustably connected with the foot;

a rotation axis extending through the adjusting instrument around which the housing is adjustable;

a passage opening formed within the adjusting instrument around the rotation axis, the passage opening configured for passing through a cable tree;

a first slot extending along a height of the housing providing lateral access to the passage opening; and a second slot extending along a height of the foot providing lateral access to the passage opening, wherein the first slot of the housing aligns with the second slot of the foot upon adjustment of the housing relative to the foot to provide lateral access to the passage opening for laterally introducing a cable tree into the passage opening.

2. The adjusting instrument according to claim 1 further comprising a closing element for locking the cable tree in the passage opening.

3. The adjusting instrument according to claim 2, wherein the closing element is a filler piece, a ring, or a hook, and the filler piece is introduced into at least one of the first slot or the second slot to at least partially fill up the first and second slots following insertion of the cable tree into the passage opening.

4. The adjusting instrument according to claim 1 further comprising a passage tube receivable in the passage opening, wherein the passage tube comprises a third slot configured to provide lateral access for introducing the cable tree.

5. The adjusting instrument according to claim 4, wherein the passage tube is adjustable relative to the adjusting instrument such that the third slot of the passage tube may be aligned with the first slot and the second slot to provide lateral access to the passage tube, or not aligned with at least one of the first slot or the second slot to lock the cable tree in the passage tube.

6. The adjusting instrument according to claim 4, wherein the passage tube comprises a lower flange which extends in a direction transverse to a length of the passage tube.

7. The adjusting instrument according to claim 6, wherein the passage tube further comprises an upper flange which extends in a direction transverse to the length of the passage tube for locking the adjusting instrument in an axial direction between the upper and the lower flange.

8. The adjusting instrument according to claim 1, further comprising a drive unit for adjusting the housing relative to the foot.

9. The adjusting instrument according to claim 8, wherein the drive unit comprises a drive wheel along which the housing is adjustable, the drive wheel further comprising a fourth slot configured to provide lateral access to the passage opening.

10. The adjusting instrument according to claim 1, wherein the housing is biased towards the foot by at least one elastic element placed at a distance from the rotation axis or around the rotation axis.

11. The adjusting instrument according to claim 1, wherein the adjusting instrument comprises first cooperating elements and the fixed element of the motor vehicle comprises second cooperating elements, wherein the first cooperating elements are translatable relative to the second cooperating elements in one direction and block translation in an opposite direction for connection of the adjusting instrument with the fixed element of the motor vehicle.

12. A motor vehicle comprising the adjusting instrument according to claim 1.

13. An exterior mirror for a motor vehicle comprising the adjusting instrument according to claim 1.

14. The adjusting instrument according to claim 1, wherein the fixed element of the motor vehicle is a mirror shoe.

15. A method for assembling a cable tree in an adjusting instrument for an exterior mirror of a motor vehicle comprising:

adjusting a housing of the adjusting instrument relative to a foot of the adjusting instrument such that a first slot of the housing aligns with a second slot of the foot, wherein both the first slot and the second slot provide lateral access to a passage opening of the adjusting instrument; and introducing the cable tree into the passage opening using the lateral access, wherein the foot is configured for attachment to a fixed element of the motor vehicle, the housing is adjustably connected with the foot, the first slot extends along a height of the housing, the second slot extends along a height of the foot, and the passage opening is formed within the adjusting instrument around a rotation axis around which the housing is adjustable, wherein the passage opening is configured for passing through a cable tree.

16. The method for assembling a cable tree in an adjusting instrument for an exterior mirror of a motor vehicle of claim 15 further comprising locking the cable tree in the passage opening using a closing element of the adjusting instrument.

17. The method for assembling a cable tree in an adjusting instrument for an exterior mirror of a motor vehicle of claim 15 further comprising:

receiving a passage tube within the passage opening, the passage tube having a third slot; and adjusting of the passage tube within the passage opening such that the third slot aligns with the first slot and the second slot to provide lateral access to the passage tube.

18. The method for assembling a cable tree in an adjusting instrument for an exterior mirror of a motor vehicle of claim 17 further comprising locking the cable tree in the passage tube by adjusting the passage tube within the passage opening such that the third slot does not align with at least one of the first slot or the second slot.

19. The method for assembling a cable tree in an adjusting instrument for an exterior mirror of a motor vehicle of claim 17, wherein the passage tube further comprises a lower flange and an upper flange which extend in a direction transverse to a length of the passage tube for locking the adjustment instrument in an axial direction between the lower flange and the upper flange.

20. The method for assembling a cable tree in an adjusting instrument for an exterior mirror of a motor vehicle of claim 15 further comprising inserting at least a first cooperating element of the adjusting instrument into a corresponding second cooperating element of the fixed element for attachment of the adjusting instrument to the exterior mirror.

* * * * *